(12) United States Patent
Keefer

(10) Patent No.: US 6,778,294 B1
(45) Date of Patent: Aug. 17, 2004

(54) PALETTE COLOR CACHE

(75) Inventor: David A. Keefer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/181,172

(22) Filed: Oct. 26, 1998

(51) Int. Cl.[7] .............................................. G06K 15/00
(52) U.S. Cl. ......................................... 358/1.9; 358/1.1
(58) Field of Search ................................. 358/1.1, 1.13, 358/1.14, 1.9, 533, 554, 115, 116, 523, 504, 500, 524; 382/167, 162; 345/600, 601, 602, 603, 604, 605

(56) References Cited

U.S. PATENT DOCUMENTS 5,450,532 A * 9/1995 Bockman .................... 358/1.16

* cited by examiner

Primary Examiner—Arthur G. Evans

(57) ABSTRACT

A color printer receives N-bit values indicating a computer generated color to be printed. Each N-bit value has a most significant bit (MSB). Upon receiving the N-bit color values, the color printer creates an address from combined multiple-bit segments of each of the received N-bit values, each multiple bit segment includes at least a MSB of each N-bit value. The color printer includes a cache memory, each cache address including first and second entries. The first entry being values indicative of a computer generated color and the second entry being values usable by the color printer to reproduce a color indicated by the first entry. A processor determines if there is a match at an address created from a received computer color value between the first entry and the received computer color value. The processor is responsive to a determined match to access the second entry at the address and to employ the second entry to control the color printer.

13 Claims, 4 Drawing Sheets

PALETTE COLOR CACHE

FIELD OF THE INVENTION

This invention relates in general to color printer technology and, more particularly, to a color printer that employs cache memories for conversion of received computer-generated color values to printer color values.

BACKGROUND OF THE INVENTION

Eight bit values (bytes) are used by personal computers (PC's) to designate colors in a Red Green Blue (RGB) color space. The colors Red, Green, and Blue are the primary colors in a RGB color space. Each byte represents one primary color. Colors are selected by assigning values to the bytes representing each primary color. To produce colors, a PC uses combinations of values for the bytes to control the computer's display device (e.g. a color monitor). Together these three byte (i.e. 24 bit) color value can represent over 16 million different colors. Each color is reproduced by appropriate control of the monitor's color producing devices. When, however, a color laser printer is called upon to accurately reproduce that many color values, extensive color processing is required that adds significantly to the execution time of the printer.

Color laser printers use a Cyan Magenta Yellow (CMY) color space. As a result, each RGB color value sent from the PC to a color laser printer must be converted to a CMY color value. A simple color space conversion is represented by the equation:

$$\begin{bmatrix} C \\ M \\ Y \end{bmatrix} = \begin{bmatrix} 1 \\ 1 \\ 1 \end{bmatrix} - \begin{bmatrix} R \\ G \\ B \end{bmatrix}$$

However, ink pigments are not perfect. Thus, in order to match screen colors on paper, extensive modification of the simple equation is required.

In order to reproduce a received color value, a color laser printer must convert the color value into a color command that is recognized by the laser printer engine. It is impractical to produce a color table map that will map all possible PC-generated input colors to laser engine color codes. As a result, many color laser printer drivers employ a cache scheme that is combined with a color table/map to accomplish the conversion. The procedures employed by the prior art color laser printers will be better understood by referring to FIGS. 1 and 2.

In FIG. 1, a high level block diagram illustrates a color laser printer 10 and a connected personal computer (PC) 12. PC 12 generates three byte color values to enable display 14 to display any of over 16 million colors. If hard copy is required of the displayed image, a three byte value 16 defining red, green, and blue values, is transferred as a PC-RGB value over interface connection 18 to PC-RGB register 20 in printer 10. A microprocessor 22 in printer 10 then truncates the received PC-RGB value into a cache address and stores the address value in a cache address register 24. The truncation action uses only the four least significant bits of each byte to make up a 12 bit address value. That address value is then utilized to address a color cache 26 to determine if, at that address, a source RGB value is stored that matches the value in PC-RGB register 20. If the color values matches, a corresponding "destination" CMY value is accessed from the same address in color cache 26 and is employed by microprocessor 22 to control color print engine 28. If no match is found, the value in PC-RGB register 20 is fed to a color map 30.

It will be understood that employing only the four least significant bits of each of the red, green and blue bytes in PC-RGB value 16 allowed many possible addresses are ignored. Thus, at any designated address, there is a substantial possibility that the source RGB value 42 will not match the PC-RGB value. In such cases, resort to color map 30 becomes necessary. To preserve memory space, color map 30 only contains a limited number of selected color values and corresponding color print engine control values. As a result, if a received PC-RGB value is not found in color map 30 (as is likely), an interpolation procedure is executed using bracketing color values from color map 30. This action, while enabling an interpolated color print engine control value to be determined, is time consuming and slows the performance of color laser printer 10.

In FIG. 2, a diagram illustrates further detail of the above-described procedure employed by color laser printer 10 in response to a received PC-RGB value 16. Microprocessor 22 accesses the lower-most four significant bits of each of the red, green, and blue bytes to create a 12 bit concatenated address value 40. Address value 40 is then used to access one of the positions within color cache 26.

Color cache 26 contains two entries at each 12 bit address, i.e., a "source" RGB value 42 comprising three eight bit bytes of red, green, and blue values and an associated "destination" CMY color value which also comprises three color value bytes, which color values are employed to control color print engine 28 (FIG. 1). Different destination CMY color values 62 are required due to the fact that color print engine 28 operates in a "dither" mode to reproduce PC-RGB color values. The dither mode, in essence, calls for the interspersal of color dots of plural color values, which when viewed from a distance, appear to reproduce the desired PC-RGB value.

Initially (decision box 46), if it is determined that source RGB value entry 42 is equal to a received PC-RGB value, destination CMY color value 44 is returned to color print engine 28 (box 48). If however, source RGB value 42 is found not to match the PC-RGB value, then color map 30 is accessed at a source RGB color value that most closely matched the value in PC-RGB register 20. An interpolation procedure then obtains a destination CMY color value to be used to control color print engine 28 (box 50).

To update color cache 26 (box 52), the source RGB and destination CMY color values are replaced at the previously accessed address, as follows: the value in PC-RGB register 20 replaces source RGB value 42 at the address and the interpolated destination CMY color value replaces destination CMY color value 44. As a result of the described replacement procedure, color cache 26 is continually updated with newly interpolated values.

Color cache 26 is most effective when an image or document is printed which includes many slight variations of a particular color. When a color is varied slightly, the most significant bits of the color value remain unchanged and the least significant bits are altered. As color values with the same most significant bits are received and processed by color laser printer 10, color cache 26 is filled with the most of or all of the variations of the least significant bits. Thus any incoming color value with the same most significant bits will find a match in color cache 26.

SUMMARY OF THE INVENTION

According to principles of the present invention in a preferred embodiment, a color printer includes a palette color cache preloaded with predetermined palette colors. The palette color cache includes source and destination entries at each cache address. Each source entry includes values indicative of a computer generated color and each destination entry includes values usable by the color printer to reproduce the color indicated by the source entry.

According to further principles of the present invention, the color printer receives P, N-bit values indicating a computer generated color to be printed. Each N-bit value has a most significant bit (MSB). Upon receiving P, N-bit color values, the color printer creates an address from P combined multiple-bit segments of each of the received N-bit values, each multiple bit segment including at least a MSB of each N-bit value. A processor determines if there is a match at the address created from a received computer color value between a source entry and the received computer color value. The processor is responsive to a determined match to access the destination entry at the address and to employ the destination entry to control the color printer.

It has been noticed that many application provide a default color palette. The default color palette includes a collection of relatively few diverse colors used to decorate a document. These colors typically consist of primary and secondary colors, favorite colors, and a few shades of gray. The most significant bits for these colors usually vary widely. Since the most significant bits of the default palette colors are usually not the same, the prior art color cache is not very effective when using the colors from the default color palettes.

Other objects, advantages, and capabilities of the present invention will become more apparent as the description proceeds.

DETAILED DESCRIPTION OF THE INVENTION

Figure 1:
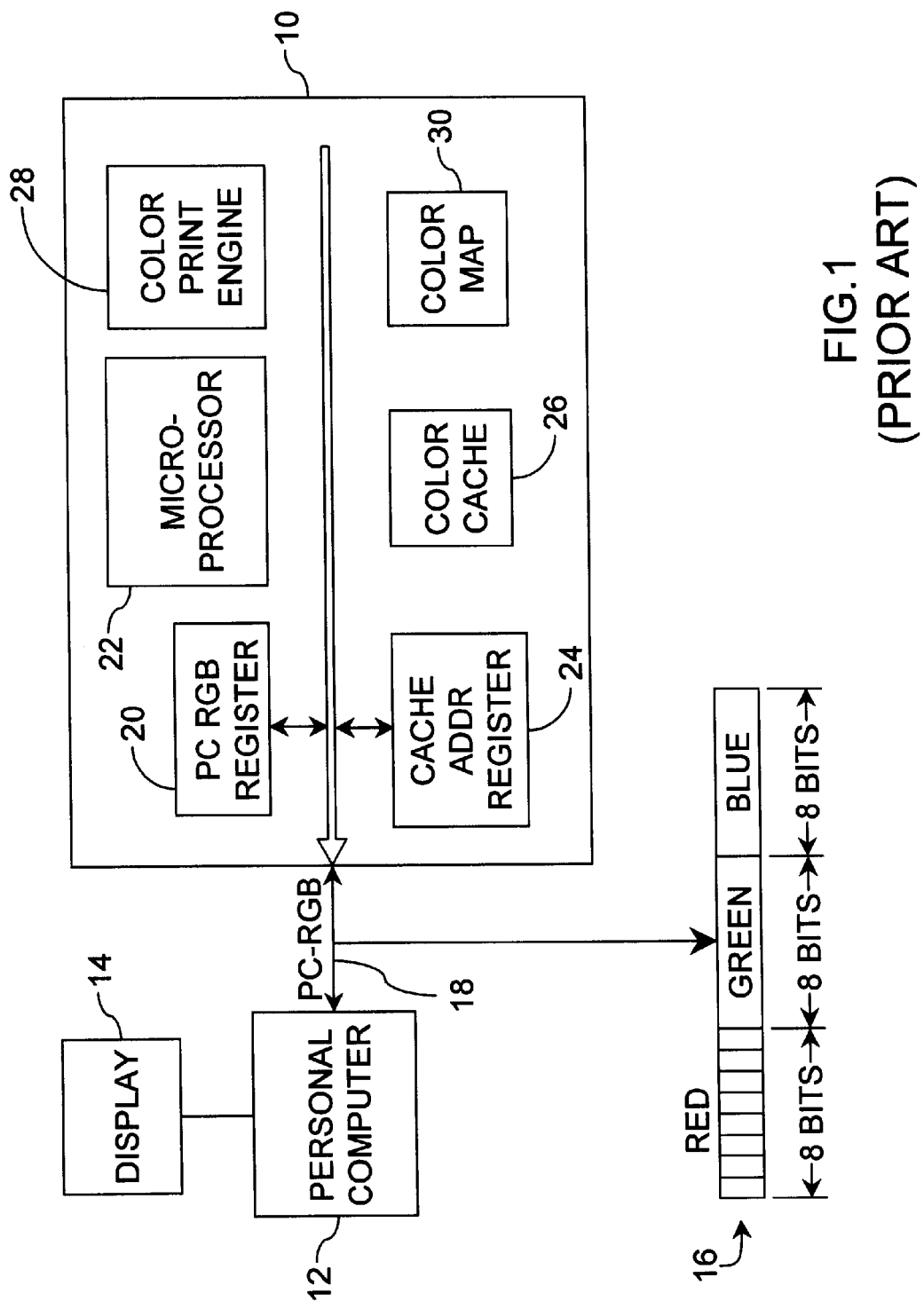
FIG. 1 is a block diagram of a prior art color printing system with an attached computer.
Figure 2:
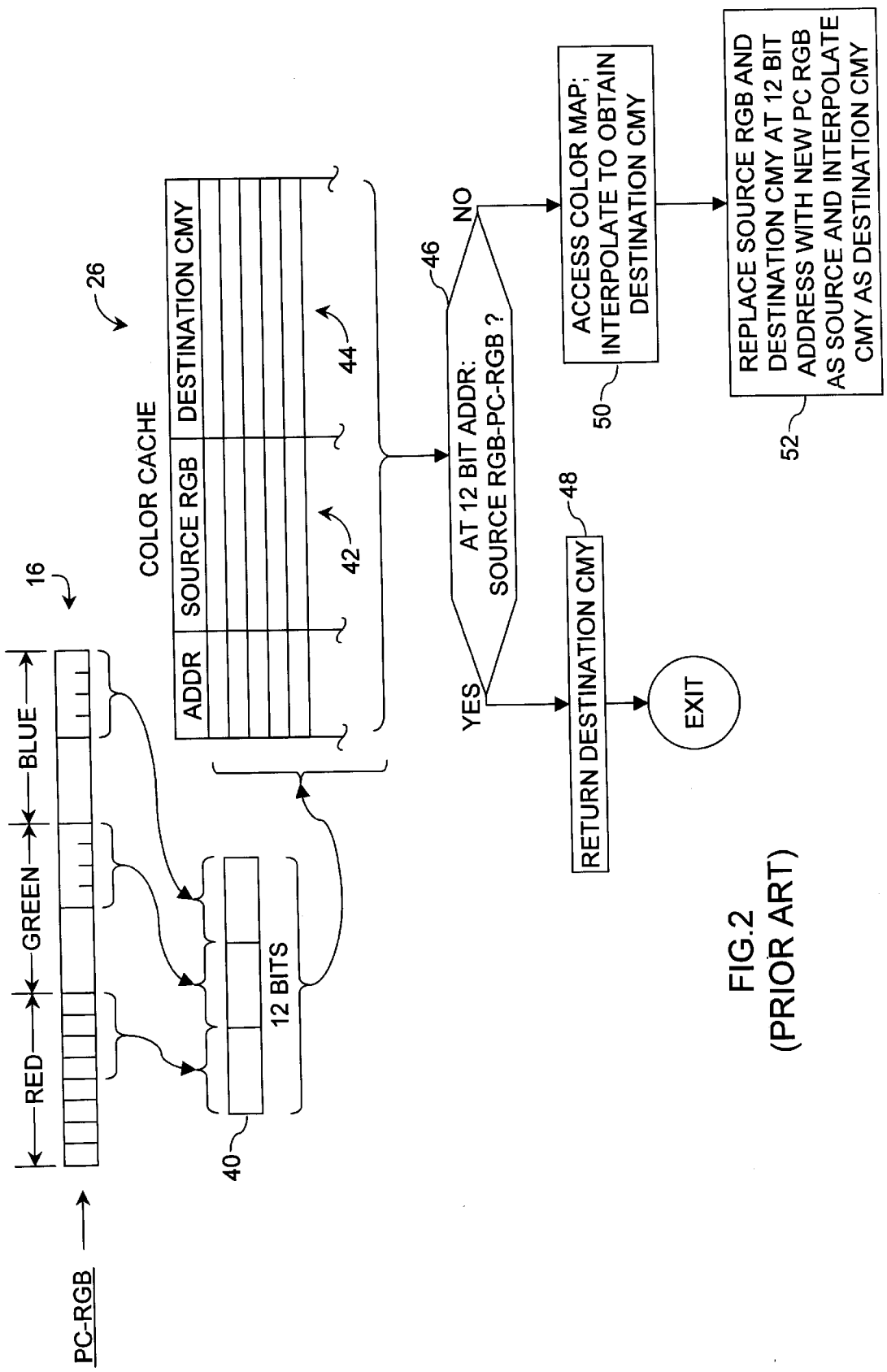
FIG. 2 is a diagram illustrating the process of color caching of the prior art.
Figure 3:
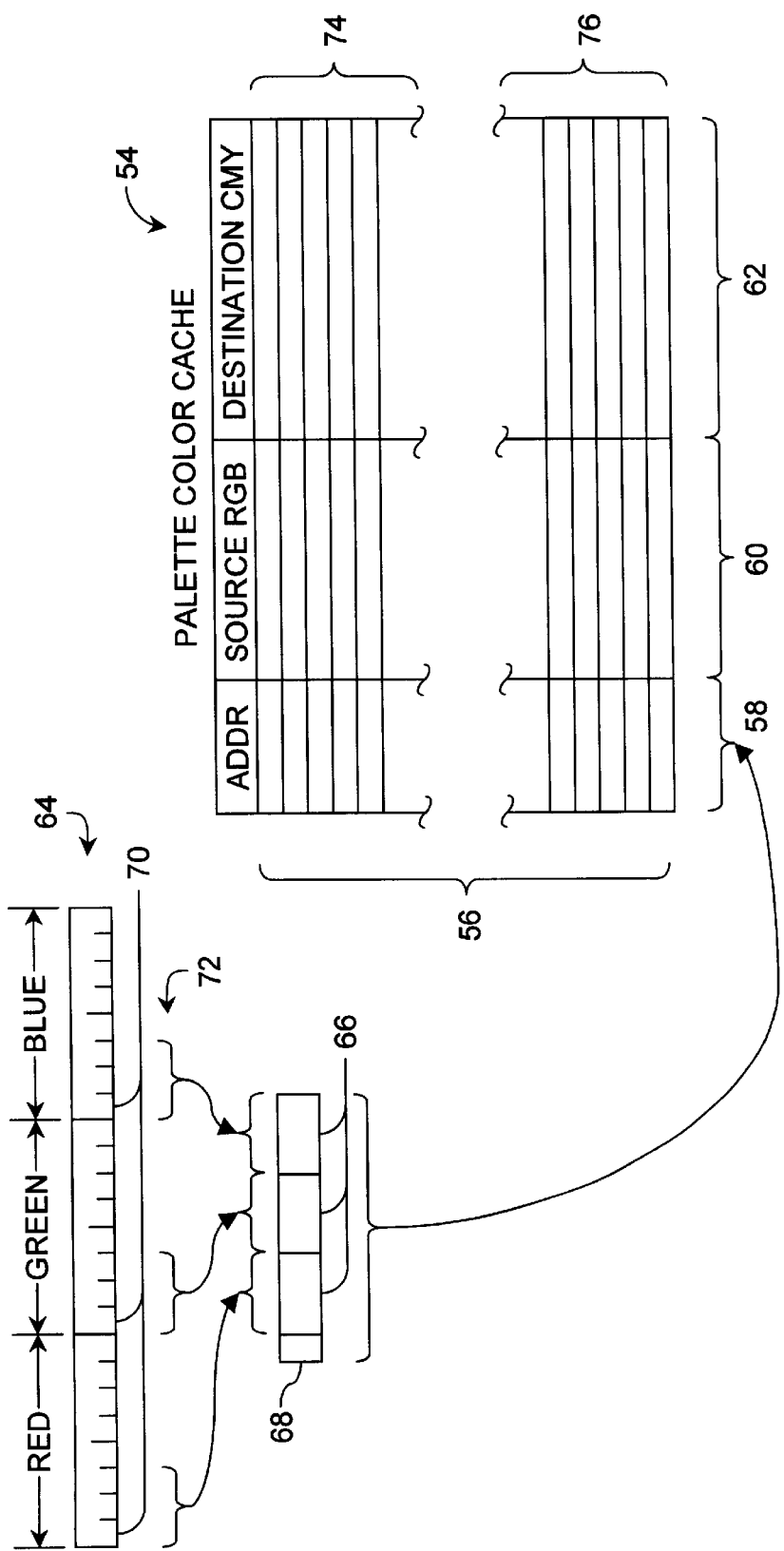
FIG. 3 is a block diagram of the present invention color printing system with an attached computer.

FIG. 3 illustrates the palette color cache 54 of the present invention. Palette color cache 54 includes a cache memory preloaded with palette color values. Preloading palette color cache 54 allows the color printer to bypass the interpolation process for those colors loaded in palette color cache 54.

In one embodiment, palette color cache 54 is preloaded with the default colors of many popular software applications and palette color cache 54 palette color cache 54 is preloaded during production of the color printer. In another embodiment, palette color cache 54 is preloaded with colors selected by a user of the color printer and palette color cache 54 is preloaded by the user.

Palette color cache 54 is divided into address locations 56. Each address location 56 includes an address, a source RGB color value 60, and a destination CMY color value 62. Source RGB color value 60 is a value that corresponds to a value 64 which could be generated by a PC for displaying a selected color on a color monitor. Destination CMY color value 62 is a value usable by the color printer to reproduce the selected color. The destination color value may be a screen match color or a vivid color. Screen match colors are those colors which most closely resemble the selected color as displayed on the color monitor. Vivid colors are fully saturated colors which reproduce the selected color as intensely as possible.

Address 58 of each address location 56 in palette color cache 54 includes multiple-bit segments 66 of the bytes 68 which comprise source RGB color value 60. In one embodiment, address 58 includes at least the most significant bit 70 of each byte 68 of source RGB color value 60. In a narrower embodiment, address 58 includes the three most significant bits 72 of each byte 68 of source RGB color value 60.

In one embodiment, palette color cache 54 is additionally partitioned into two sections. One section 74 is for screen match colors and the other section 76 is for vivid colors. Each section 74, 76 is preloaded with the appropriate color palette color values 60, 62. In this embodiment, one additional bit 78 is included in address 58 to distinguish between the screen match color section 74 and the vivid color section 76 of palette color cache 54.

Figure 4:
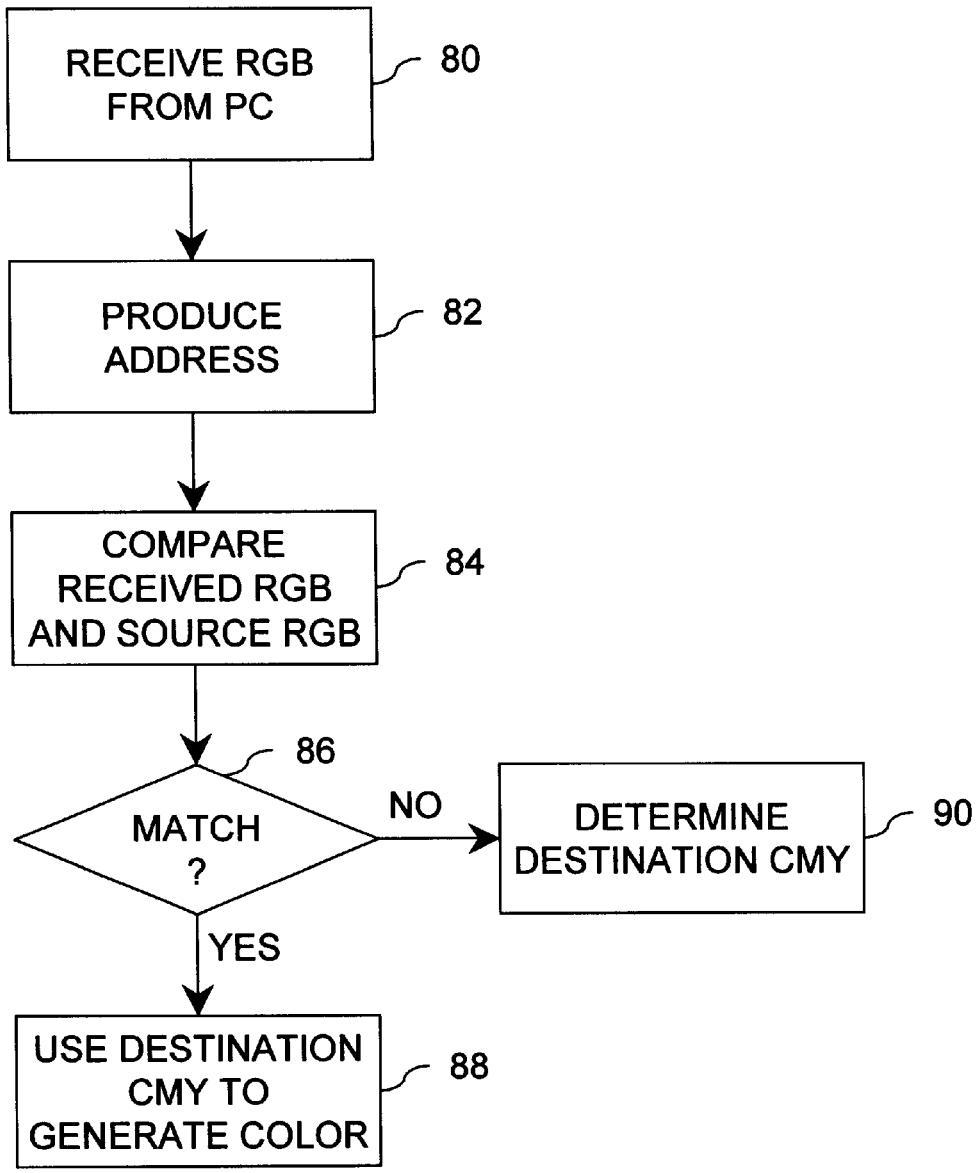
FIG. 4 is a flow chart illustrating the process of color caching of the present invention.

FIG. 4 illustrated the process in which palette color cache 54 is used. A color laser printer receives 80 a RGB color value from a computer. The RGB color value is indicative of a color to be printed by the color laser printer. The three most significant bits 72 of each byte 68 of the RGB color value are used to produce 82 an address 58. In one embodiment, an additional bit 78 is included in address 58 to indicate whether the screen match section 74 or the vivid color section 76 of palette color cache 54 should be addressed.

Source RGB color value 60 stored at the produced address 58 is next compared 84 to the received RGB color value. If the RGB color values match 86, destination CMY color value 62 is used 88 by the laser printer to generate the color indicated by the received RGB color value. If the RGB color values do not match 90, the laser printer uses alternative means for determining a destination CMY color value 62.

It should be understood that the foregoing description is only illustrative of the invention. Various alternatives and modifications can be devised by those skilled in the art without departing from the invention. In addition, while the invention has been described with respect to a color laser printer, it is equally applicable to other color output apparatus which is required to perform a color transformation. Accordingly, the present invention is intended to embrace all such alternatives, modifications and variances which fall within the scope of the appended claims.

What is claimed is:

1. A palette color cache comprising address locations preloaded with predetermined palette color values, each palette color value including at least one N-bit palette color value, each cache address location including an address, a source entry, and a destination entry, the address comprising at least the most significant bits of each N-Bit palette color value, the source entry comprising values indicative of a computer generated color and the destination entry usable by the color output apparatus to reproduce a color indicated by the source entry, wherein the palette color cache is divided into first and second partitions and wherein predetermined screen match palette color values are preloaded into the first partition and predetermined vivid palette color values are preloaded into the second partition.

2. The palette color cache of claim 1 wherein at least the most significant bits of each N-bit palette color value includes the three most significant bits of each N-bit palette color value.

3. The palette color cache of claim 1 wherein predetermined screen match palette color values are preloaded into the first partition and predetermined vivid palette color values are preloaded into the second partition.

4. A color output apparatus for receiving from a computer, at least one N-bit color value indicating a computer generated color to be printed, the color output apparatus comprising:

(a) cache memory means having address locations preloaded with predetermined palette color values including at least one N-bit palette color value, each cache address location including an address, a source entry, and a destination entry, the source entry comprising values indicative of a computer generated color and the destination entry usable by the color output apparatus to reproduce a color indicated by the source entry;

(b) means for creating an address from at least the most significant bits of each N-bit color value of a received computer generated color value; and, (c) processor means for determining a match between the source entry and a received computer generated color value at an address created from the received computer generated color value, the processor means further responsive to a determined match at the address, to access the destination entry at the address and to employ the destination entry at the address to control the color output apparatus.

5. The color output apparatus of claim 4 wherein at least the most significant bits of each N-bit palette color value includes the three most significant bits of each N-bit palette color value.

6. The color output apparatus of claim 4 wherein the created address is a concatenation of the at least the most significant bit from each N-bit received color value.

7. The color output apparatus of claim 4 wherein the cache memory means is divided into first and second partitions and wherein predetermined screen match palette color values are preloaded into the first partition and predetermined vivid palette color values are preloaded into the second partition.

8. The color output apparatus of claim 7 wherein the created address further includes at least one bit to indicate a partition address location in the cache memory means.

9. A method for converting RGB color values received from a computer to color values usable by a color output device, the color output device including a controlling processor, a cache memory including address locations, and a color output device engine, each address location of the cache memory including an address, a source entry, and a destination entry, the source entry being a RGB value and the destination entry being a color value usable by the color printer engine to reproduce the color of the source entry, the method comprising:

(a) preloading the cache memory with predetermined palette color values, each palette color value including at least one N-bit palette color value;

(b) receiving a RGB color value from a computer, the RGB color value comprising at least one N-bit color value;

(c) creating a cache address from the received RGB color value by combining at least the most significant bits of each N-bit color value of the received RGB color value;

(d) determining if a match occurs between the received RGB color value and a source entry in the cache memory at the cache address created from the received RGB color value; and, (e) responding to a match at the cache address by accessing the destination entry at the cache address and employing the destination entry to control the color printer engine.

10. The method of claim 9 wherein preloading the cache memory with predetermined palette color values includes:

(a) determining an address location for each palette color value;

(b) providing in the source entry of the determined address location the palette color value; and, (c) providing in the destination entry of the determined address location a value usable by the color output apparatus to reproduce a color indicated by the source entry.

11. The palette color cache of claim 9 wherein combining at least the most significant bits of each N-bit palette color value includes combining the three most significant bits of each N-bit palette color value.

12. The method of claim 9 further including partitioning the palette color cache into first and second partitions.

13. The method of claim 12 further including preloading predetermined screen match palette color values into the first partition and preloading predetermined vivid palette color values into the second partition.

* * * * *